US012789621B2

(12) United States Patent
Bessho

(10) Patent No.: US 12,789,621 B2
(45) Date of Patent: Nov. 10, 2026

(54) ELECTRIC MOTOR POWER TRAIN AND UTILITY VEHICLE

(71) Applicant: Kubota Corporation, Osaka (JP)

(72) Inventor: Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 265 days.

(21) Appl. No.: 18/640,238

(22) Filed: Apr. 19, 2024

(65) Prior Publication Data

US 2024/0359555 A1 Oct. 31, 2024

(30) Foreign Application Priority Data

Apr. 26, 2023 (JP) ................................ 2023-072429

(51) Int. Cl.

*B60K 17/02* (2006.01)
*B60K 1/02* (2006.01)
*B60K 17/28* (2006.01)
*B60K 23/02* (2006.01)

(52) U.S. Cl.

CPC ................ *B60K 17/02* (2013.01); *B60K 1/02* (2013.01); *B60K 17/28* (2013.01); *B60K 23/02* (2013.01)

(58) Field of Classification Search

CPC .......... B60K 1/02; B60K 17/02; B60K 17/28; B60K 23/02

See application file for complete search history.

(56) References Cited

U.S. PATENT DOCUMENTS

| | | | | |
|---|---|---|---|---|
| 2009/0018716 | A1* | 1/2009 | Ambrosio | B60W 20/00 903/906 |
| 2010/0234172 | A1* | 9/2010 | Miyazaki | B60W 10/02 903/945 |
| 2017/0158044 | A1 | 6/2017 | Sakai et al. | |
| 2019/0077259 | A1* | 3/2019 | Singh | B60K 25/06 |
| 2019/0289771 | A1* | 9/2019 | Lang | A01B 71/06 |
| 2021/0260981 | A1* | 8/2021 | Gerty | B60K 17/02 |
| 2023/0010534 | A1 | 1/2023 | Miyazaki | |

FOREIGN PATENT DOCUMENTS

| | | | |
|---|---|---|---|
| JP | 2003136970 | A | 5/2003 |
| JP | 2013141955 | A | 7/2013 |
| JP | 5826037 | B2 | 10/2015 |
| JP | 2017105243 | A | 6/2017 |
| JP | 202198460 | A | 7/2021 |
| JP | 2021104768 | A | 7/2021 |

* cited by examiner

*Primary Examiner* — Edwin A Young
(74) *Attorney, Agent, or Firm* — The Webb Law Firm

(57) ABSTRACT

An electric motor power train includes a main motor 4; a power take-off (PTO) motor 7; a PTO shaft 71 configured to transmit an output of the PTO motor 7 to a PTO device 70; a transmission 5 configured to receive an output of the main motor 4 and the output of the PTO motor 7; drive shafts 62 coupled to the respective driving wheels 1; a differential device 61 configured to transmit an output of the transmission 5 to the drive shafts 62; and a motive power transmission switching device 8 configured to switch a state of transmission of the output of the PTO motor 7 to the transmission 5.

3 Claims, 4 Drawing Sheets

ELECTRIC MOTOR POWER TRAIN AND UTILITY VEHICLE

CROSS-REFERENCE TO RELATED APPLICATION

This application claims priority to Japanese Patent Application No. 2023-072429 filed Apr. 26, 2023, the disclosure of which is hereby incorporated by reference in its entirety.

BACKGROUND OF THE INVENTION

Field of the Invention

The present invention relates to an electric motor power train including an electric motor as a motive power source to drive wheels of a vehicle, and to a utility vehicle including an electric motor power train.

Description of Related Art

Electric and hybrid vehicles including an electric motor power train are widespread not only in the field of passenger vehicles, but also in the fields of work vehicles and utility vehicles. Patent Literature 1 (Japanese Unexamined Patent Application Publication, Tokukai, No. 2017-105243), for example, discloses a utility vehicle including a pair of left and right rear wheels, a pair of left and right front wheels, an engine configured to drive the rear wheels, a motor configured to drive the front wheels, and a control device configured to switch between different drive modes, namely, an engine two-wheel drive mode, in which the control device drives the engine alone, a motor two-wheel drive mode, in which the control device drives the motor alone, and a hybrid four-wheel drive mode, in which the control device drives both the engine and the motor.

Patent Literature 2 (Japanese Unexamined Patent Application Publication, Tokukai, No. 2021-104768) discloses a tractor including a battery, a motor, and a transmission device configured to vary motive power from the motor and transmit the varied motive power to left and right rear wheels and front wheels to drive the wheels. The tractor also includes a power takeoff (PTO) shaft drivable by the motor, and is configured to drive an implement such as a tiller device on motive power from the PTO shaft.

The utility vehicle disclosed in Patent Literature 1 is capable of traveling in one of a plurality of drive modes. The document, however, fails to discuss a PTO function for supplying motive power to an implement other than the wheels. The tractor disclosed in Patent Literature 2 does include a PTO shaft for supplying motive power to an implement. The PTO shaft is, however, configured to receive motive power from the motor, which drives the wheels. Traveling while driving an implement imposes a heavy load on the motor: The tractor requires a large-capacity motor. Such a large-capacity motor unfortunately has an excessive performance when the tractor does not drive an implement or only drives a low-load implement.

SUMMARY OF THE INVENTION

The present invention has an object of providing an electric motor power train that allows motor outputs to be used appropriately in accordance with various states of how the vehicle is traveling, and a utility vehicle including the electric motor power train.

An electric motor power train as an embodiment of the present invention for transmitting motive power to driving wheels of a vehicle includes: a power take-off (PTO) motor; a PTO shaft configured to transmit an output of the PTO motor to a PTO device; a transmission configured to receive an output of the main motor and the output of the PTO motor; drive shafts coupled to the respective driving wheels; a differential device configured to transmit an output of the transmission to the drive shafts; and a motive power transmission switching device configured to switch a state of transmission of the output of the PTO motor to the transmission.

The above configuration allows the main motor alone to be driven while the vehicle is traveling normally, and allows the PTO motor alone to be driven while the vehicle is at rest, and the PTO device is being driven. The above configuration allows both the main motor and the PTO motor to supply their respective outputs to the wheels while the vehicle is traveling on a bad road or a slope, and the traveling load is heavy. The above configuration also allows the PTO motor to supply its output to the PTO device and the main motor to supply its output to the driving wheels while the vehicle is traveling and driving an implement. The electric motor power train as an embodiment of the present invention, as described above, allows motor outputs to be used appropriately in accordance with various travel states.

The electric motor power train may, as an embodiment of the present invention, be further configured such that the motive power transmission switching device includes: a switching clutch; and an operation section configured to set the switching clutch into a first state or a second state, in the first state, the motive power transmission switching device allows the output of the PTO motor to be transmitted to the transmission, and in the second state, the motive power transmission switching device prevents the output of the PTO motor from being transmitted to the transmission. This configuration involves a switching clutch disposed on a bridge path between motive power transmission paths for the respective outputs of the PTO motor and the main motor and configured to turn on and off the motive power transmission through the bridge path. The switching clutch is operable with use of the operation section into the first state, in which the switching clutch allows motive power transmission through the bridge path, or the second state, in which the switching clutch prevents motive power transmission through the bridge path. The first state allows the output of the PTO motor to be added to travel motive power from the main motor.

The electric motor power train may, as an embodiment of the present invention, be further configured such that the operation section includes a mechanical interlocking mechanism configured to transmit an operation movement of a manual operation tool to the switching clutch. This configuration allows an operation movement of a manual operation tool to be transmitted to the switching clutch through a mechanical interlocking mechanism to achieve the first or second state. This in turn allows the clutch to be operated in a manner faithful to the driver's intention.

The electric motor power train may, as an embodiment of the present invention, be further configured such that the operation section includes an electronic control mechanism configured to operate the switching clutch based on (i) an electric signal generated in response to a manual operation tool being moved and (ii) a preinstalled program. This configuration allows an operation movement of a manual operation tool to be converted into an electric signal, the electronic control mechanism to generate a control signal on the basis of the electric signal, and the switching clutch to be set into the first or second state on the basis of the control signal. The electronic control mechanism generates the control signal with use of a preinstalled program. This allows the switching clutch to be set into the first or second state under a predetermined control condition, thereby allowing flexible operation of the clutch.

The electric motor power train may, as an embodiment of the present invention, be further configured such that the motive power transmission switching device includes: a switching clutch; and an operation section configured to set the switching clutch into a first state, a second state, or a third state, in the first state, the motive power transmission switching device allows the output of the PTO motor to be transmitted to the transmission, in the second state, the motive power transmission switching device prevents the output of the PTO motor from being transmitted to the transmission, and in the third state, the motive power transmission switching device allows a portion of the output of the PTO motor to be transmitted to the transmission. This configuration allows the motive power transmission through the bridge path (which is between motive power transmission paths for the respective outputs of the PTO motor and the main motor) to be switched between not only the first and second states but also a third state, which allows a portion of the output of the PTO motor to be supplied to the driving wheels, in other words, the output of the PTO motor to be distributed to the PTO device and the driving wheels. This allows motor outputs to be used more appropriately in accordance with various travel states.

The electric motor power train may, as another embodiment of the present invention, be further configured such that the motive power transmission switching device is a one-way clutch coupled at a first end to a first power transmission shaft configured to transmit motive power from the main motor and at a second end to a second power transmission shaft configured to transmit motive power from the PTO motor. This configuration uses a one-way clutch to allow or prevent motive power transmission depending on (i) the difference between the respective rotation directions of the main motor and the PTO motor or (ii) the difference between the respective rotation speeds of the main motor and the PTO motor, specifically of the first and second power transmission shafts. With the above configuration, controlling the respective rotations of the main motor and the PTO motor determines the supply of motive power from the PTO motor to the drive shafts.

The present invention may be embodied not only as an electric motor power train but also as a utility vehicle including the electric motor power train. Utility vehicles not only include a PTO device drivable by a PTO motor, but also travel on, for example, rough terrain, rocky soil, lumpy roads, or farmland other than normal roads. Such vehicles should most suitably include an electric motor power train configured to transmit the output of the PTO motor to the driving wheels as necessary.

DESCRIPTION OF THE INVENTION

Unless otherwise stated, the present specification uses (i) the word “forward” to refer to a front side of the front-back direction (traveling direction) of the body, (ii) the word “rearward” to refer to a back side of the front-back direction (traveling direction) of the body, (iii) terms such as “left-right direction” and “lateral direction” to mean the transverse direction (width direction) of the body, which is orthogonal to the front-back direction of the body, and (iv) terms such as “upward” and “downward” to refer to a position in the vertical direction of the body, that is, a height from the ground.

Figure 1:
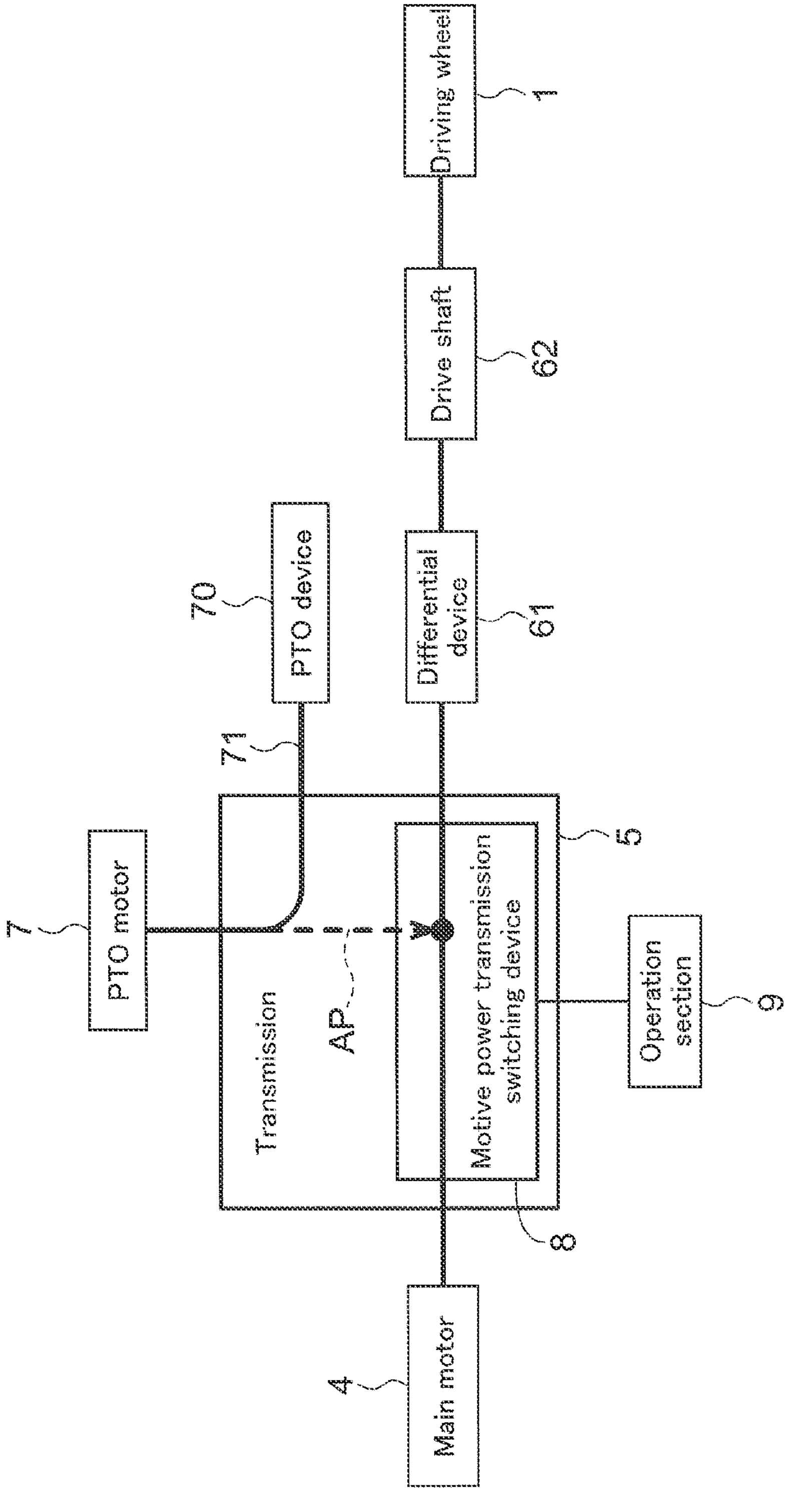
FIG. 1 is a diagram schematically illustrating the basic configuration of an electric motor power train as an embodiment of the present invention.

The description below deals first with an example basic configuration of an electric motor power train as an embodiment of the present invention with reference to FIG. 1. The electric motor power train is configured to transmit rotation motive power from electric motors to driving wheels 1 of the vehicle and to other operation devices such as a power take-off (PTO) device 70. The electric motor power train includes a main motor 4 and a PTO motor 7 as its electric motors. The electric motor power train also includes a PTO shaft 71, a transmission 5, drive shafts 62 coupled to the respective driving wheels 1, a differential device 61, and a motive power transmission switching device 8. The PTO shaft 71 is configured to transmit the output of the PTO motor 7 to the PTO device 70. The transmission 5 is configured to receive the respective outputs of the main motor 4 and the PTO motor 7, and transmit its output through the differential device 61 to the drive shafts 62 to rotate the respective driving wheels 1. The motive power transmission switching device 8 is capable of controlling merging of the output of the main motor 4 with the output of the PTO motor 7 through a branch path AP. The motive power transmission switching device 8 is, in other words, configured to switch the state of transmission of the output of the PTO motor 7 to the transmission 5.

The motive power transmission switching device 8, in a preferred embodiment, has the function of switching between a first state and a second state. In the first state, the motive power transmission switching device 8 allows the output of the PTO motor 7 to be used to rotate the driving wheels 1. In the second state, the motive power transmission switching device 8 does not allow the output of the PTO motor 7 to be used to rotate the driving wheels 1. In the first state, the motive power transmission switching device 8 allows only the output of the main motor 4 to be used to rotate the driving wheels 1. In the second state, the motive power transmission switching device 8 allows the total output of the main motor 4 and the PTO motor 7 to be used to rotate the driving wheels 1 with a greater force.

The motive power transmission switching device 8, in another embodiment, has the function of switching between not only the first state and the second state but also a third state. In the third state, the motive power transmission switching device 8 allows motive power combining the output of the main motor 4 with a portion of the output of the PTO motor 7 to be used to rotate the driving wheels 1.

The electric motor power train includes an operation section 9 for switching the motive power transmission state of the motive power transmission switching device 8. The operation section 9 is in the form of a mechanical interlocking mechanism, an electronic control mechanism, or an automatic electronic control mechanism. The mechanical interlocking mechanism includes a link mechanism configured to transmit an operation movement of a manual operation tool 31*a*. The electronic control mechanism includes a control driver (such as an electronically controlled solenoid) electronically controllable on the basis of (i) an electric signal generated in response to a manual operation tool 31*a* being moved and (ii) a preinstalled program. The automatic electronic control mechanism is configured to electronically operate a control driver with use of (i) detection signals from, for example, a travel state sensor and a PTO state sensor and (ii) a preinstalled control program.

Figure 2:
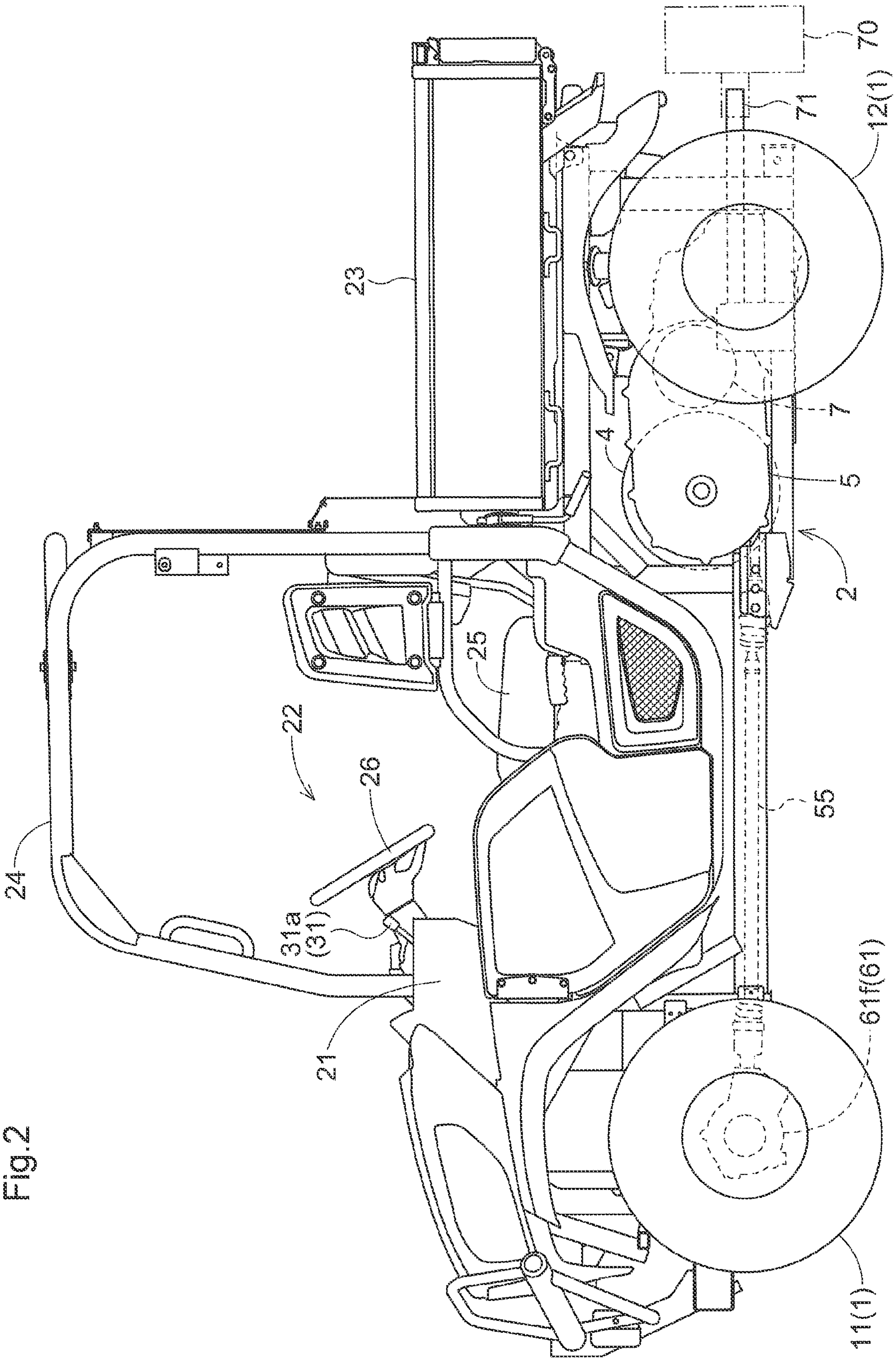
FIG. 2 is a side view of a utility vehicle including an electric motor power train.
Figure 3:
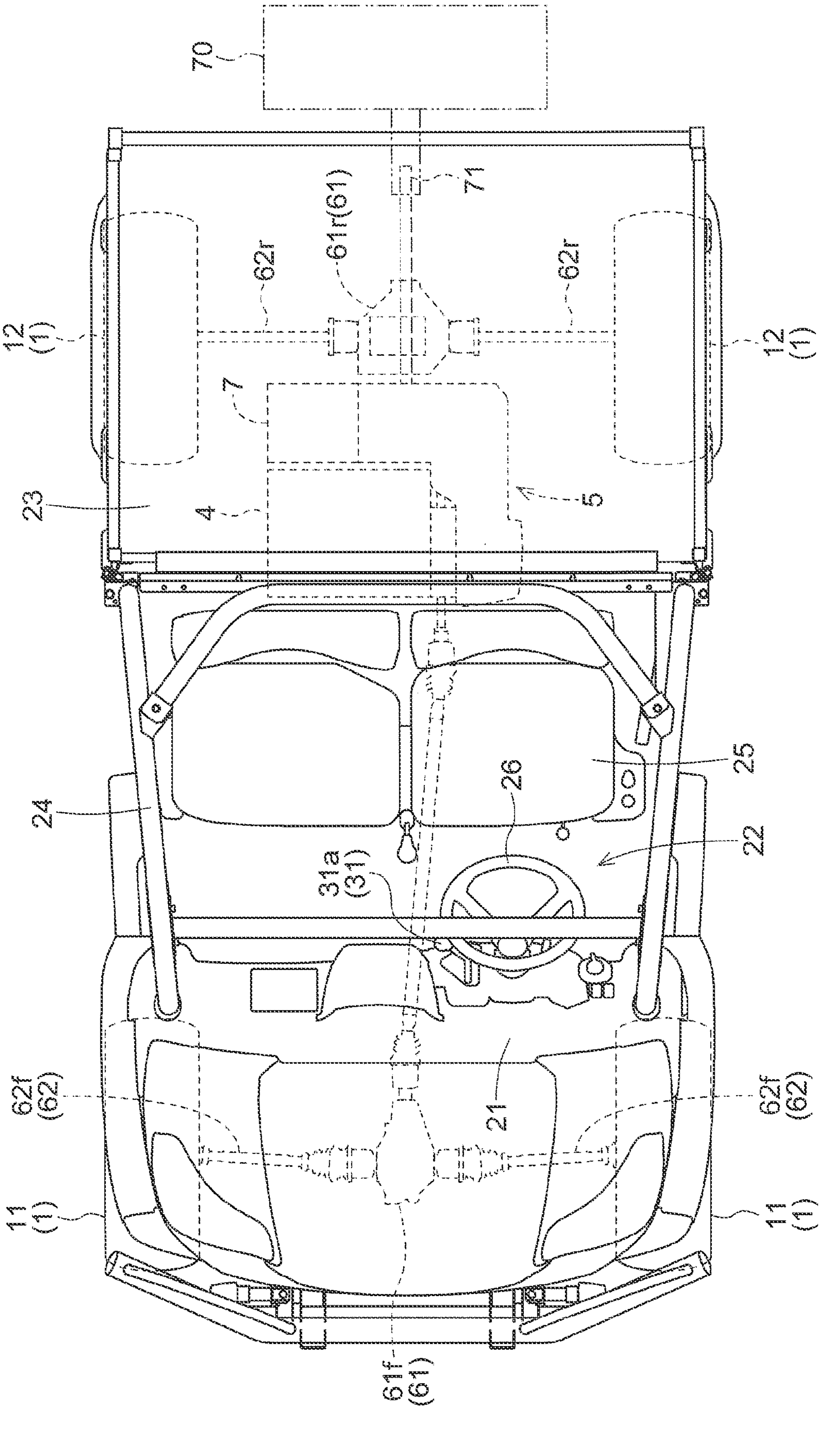
FIG. 3 is a plan view of a utility vehicle including an electric motor power train.

The description below deals, as an embodiment of the present invention, with a utility vehicle including an electric motor power train according to an embodiment of the present invention. Examples of the utility vehicle include an all-terrain vehicle (ATV), a buggy, an off-road vehicle, an agricultural work vehicle, and a construction vehicle. FIG. 2 is a side view of the utility vehicle. FIG. 3 is a plan view of the utility vehicle.

The utility vehicle includes a pair of left and right drivable and turnable front wheels 11 and a pair of left and right drivable rear wheels 12 as the driving wheels 1 as well as a body 2 capable of moving with use of the front and rear wheels 11 and 12. The utility vehicle includes (i) a driver section 22 disposed at a central portion of the body 2 and configured to accommodate an operator for driving the utility vehicle, (ii) a cargo box 23 disposed at a back portion of the body 2 and configured to receive a cargo, and (iii) a motive power unit in an area of the body 2 which area is under the cargo box 23. The motive power unit, as illustrated in FIG. 3, includes the main motor 4 as a travel motor and the transmission 5. The utility vehicle includes a rear-wheel differential device 61*r*, rear axles 62*r* as drive shafts 62 for the rear wheels 12, a propeller shaft 55, a front-wheel differential device 61*f*, and front axles 62*f* as drive shafts 62 for the front wheels 11. The transmission 5 transmits its output to the rear wheel 12 through the rear-wheel differential device 61*r* and the rear axles 62*r* and to the front wheels 11 through the propeller shaft 55, the front-wheel differential device 61*f*, and the front axles 62*f*.

The utility vehicle includes a roll-over protective structure (ROPS) frame 24 including four columns and having an arch shape to enclose and protect the driver section 22. The driver section 22 includes a driver's seat 25 for an operator to sit on, and forward of the driver's seat 25, a front panel 3 including a display device, and a steering wheel 26 for use to turn the front wheels 11. The driver section 22 also includes a manual operation tool group 31 including a shift lever, an engine rotation speed adjustment tool, and a PTO lever as well as the manual operation tool 31*a* for use to operate the motive power transmission switching device 8.

Figure 4:
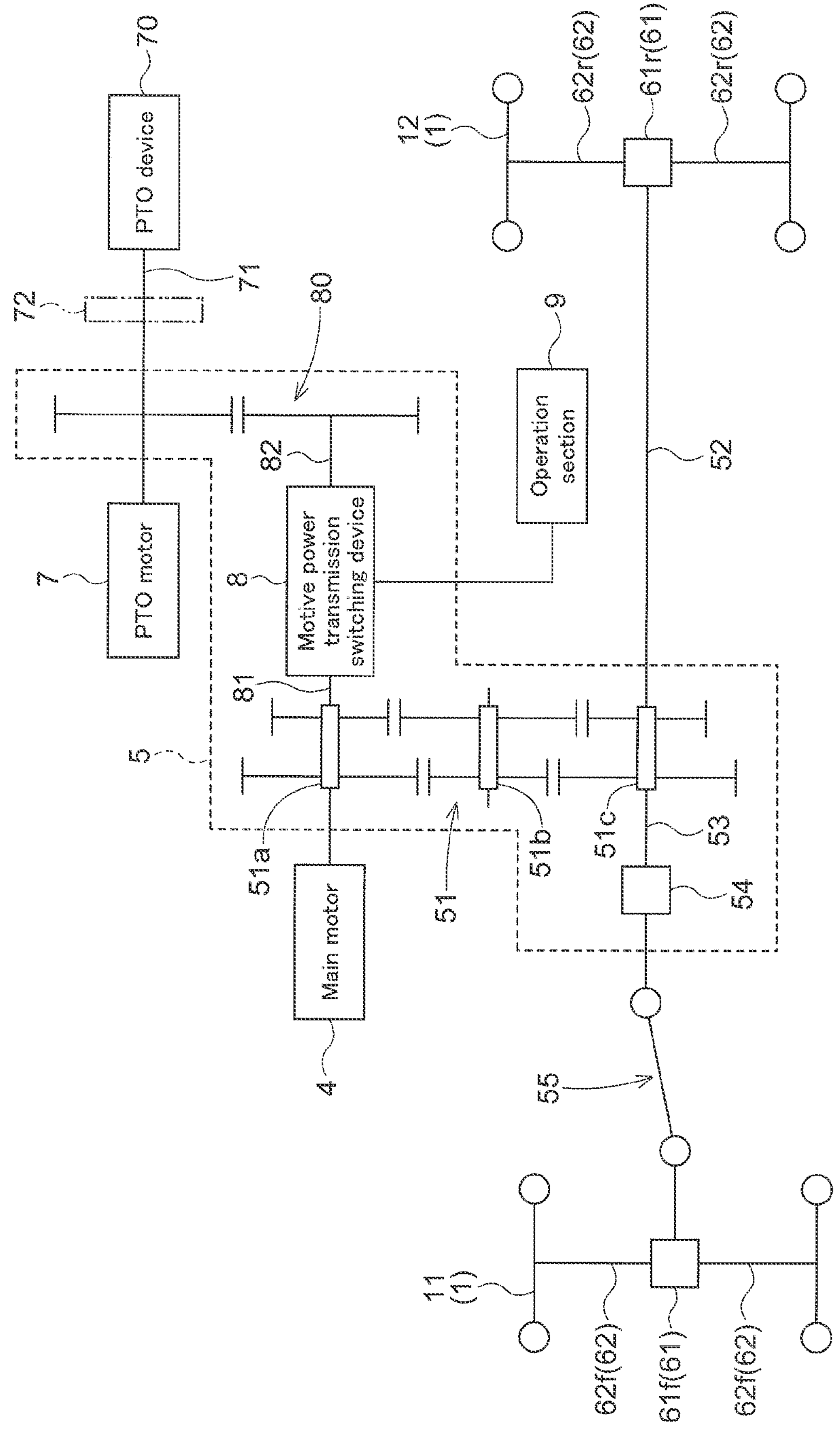
FIG. 4 is a diagram illustrating an example electric motor power train as an embodiment of the present invention.

FIG. 4 is a diagram schematically illustrating an example electric motor power train as a motive power system. The transmission 5 includes a gear shift device 51 including a first gear shift section 51*a*, a second gear shift section 51*b*, and a third gear shift section 51*c*. The third gear shift section 51*c* includes an output shaft including a rear-wheel output section 52 and a front-wheel output section 53. The rear-wheel output section 52 is coupled to an input section of the rear-wheel differential device 61*r*, which includes output sections coupled to respective first ends of the rear axles 62*r*, whose second ends are coupled to the respective rear wheels 12. The front-wheel output section 53 is coupled with the propeller shaft 55 in-between to an input section of the front-wheel differential device 61*f*, which includes output sections coupled to respective first ends of the front axles 62*f*, whose second ends are coupled to the respective front wheels 11. The transmission 5 includes a front-wheel clutch 54 disposed on the front-wheel output section 53 and configured to be engaged to allow motive power to be transmitted to the front wheels 11 and disengaged to prevent motive power from being transmitted to the front wheels 11.

The PTO motor 7 transmits its output through the PTO shaft 71 to the PTO device 70. The PTO shaft 71 for the present embodiment is provided with a gear-type branching power transmission mechanism 80 including a first power transmission shaft 81 and a second power transmission shaft 82. The first power transmission shaft 81 is coupled to the output shaft of the main motor 4. The second power transmission shaft 82 is parallel to the PTO shaft 71 and functions as a branch shaft. The first and second power transmission shafts 81 and 82 are coaxial with each other. The motive power transmission switching device 8 is interposed between the first and second power transmission shafts 81 and 82 to transmit the output of the PTO motor 7 to the driving wheels 1. In other words, the first power transmission shaft 81, as a motive power transmission path for the output of the main motor 4, and the second power transmission shaft 82, as a motive power transmission path for the output of the PTO motor 7, function as an output bridge path for transmission of motive power from the main motor 4 and the PTO motor 7, whereas the motive power transmission switching device 8 turns on and off the motive power transmission through the bridge path. The motive power transmission switching device 8 for the present embodiment is in the form of a friction clutch, a claw clutch, or even a one-way clutch as described later. The clutch of any of the above types is coupled to the first power transmission shaft 81 at one end and to the second power transmission shaft 82 at the other end.

Disengaging the clutch as the motive power transmission switching device 8 causes the output of the PTO motor 7 to be transmitted to the PTO device 70, whereas engaging the clutch allows the output of the PTO motor 7 to be transmitted to the gear shift device 51 as well to assist the main motor 4. The motive power transmission switching device 8 is usable to, while the PTO device 70 is in use, select between (i) a distribution mode for distributing the output of the PTO motor 7 to the PTO device 70 and the gear shift device 51 and (ii) a solo mode for supplying the output of the PTO motor 7 only to the PTO device 70. While the PTO device 70 is not in use, the motive power transmission switching device 8 allows the output of the PTO motor 7 to be all supplied to the gear shift device 51. The electric motor power train may include, as shown in FIG. 4 with a dashed-dotted line, a PTO clutch 72 configured to forcibly block the supply of the output of the PTO motor 7 to the PTO device 70 and cause the output of the PTO motor 7 to be supplied only to the gear shift device 51.

The motive power transmission switching device 8 is operable (that is, transmitting or blocking motive power, or engaging or disengaging the clutch) with use of the operation section 9. The operation section 9 for the present embodiment is electronically controlled. The operation section 9 includes a manual operation tool 31*a* and a control driver configured to switch the state of a switching clutch (that is, the motive power transmission switching device 8) on the basis of (i) an electric signal generated in response to the manual operation tool 31*a* being moved and (ii) a control program preinstalled in a control unit.

The operation section 9 is capable of achieving various control modes depending on what input signal and control program are used. The description below deals with examples of such control modes.

Control Mode A

Moving the manual operation tool 31*a* switches the motive power transmission switching device 8 as a switching clutch into a first state or a second state. The first state allows the output of the PTO motor 7 to be transmitted to the gear shift device 51 for the utility vehicle to travel. The second state prevents the output of the PTO motor 7 from being transmitted to the gear shift device 51, and allows it to be used only to drive the PTO device 70.

Control Mode B

Moving the manual operation tool 31*a* generates an operation signal, on the basis of which a control unit (that is, a control function section of the operation section 9) switches the switching clutch into the first state or the second state. The electric motor power train may include load sensors configured to detect the respective loads on the main motor 4 and the PTO motor 7. The control unit, in that case, switches the switching clutch into the first state or the second state on the basis of the result of the detection either independently of the operation of the manual operation tool 31*a* or in response to the driver's acceptance.

Control Mode C

The motive power transmission switching device 8 as a switching clutch is switchable into a first state, a second state, or a third state. The first state allows the output of the PTO motor 7 to be transmitted to the gear shift device 51. The second state prevents the output of the PTO motor 7 from being transmitted to the gear shift device 51. The third state prevents the output of the PTO motor 7 from being transmitted to the transmission 5 and allows a portion of the output of the PTO motor 7 to be transmitted to the gear shift device 51 and the rest of the output of the PTO motor 7 to be transmitted to the PTO device 70. The switching clutch is controllable as above on the basis of, for example, pulse-width modulation (PWM) or pulse-frequency modulation (PFM).

The utility vehicle includes batteries (not illustrated in the drawings) configured to supply electric power to the main motor 4 and the PTO motor 7. The batteries may be, for example, either under the hood forward of the driver section 22 or under the driver's seat 25, or both.

ALTERNATIVE EMBODIMENTS (1) The motive power transmission switching device 8 for the embodiment described above is a switching clutch, but may alternatively be a one-way clutch. In that case, the one-way clutch is coupled at one end to the first power transmission shaft 81 (which serves to transmit motive power from the main motor 4) and at the other end to the second power transmission shaft 82 (which serves to transmit motive power from the PTO motor 7). This configuration allows the motive power transmission switching device 8 as a one-way clutch to be engaged and disengaged depending on (i) the respective rotation directions of the main motor 4 and the PTO motor 7 and (ii) the difference between the respective rotation speeds of the main motor 4 and the PTO motor 7 (that is, of the first and second power transmission shafts 81 and 82). In other words, controlling the main motor 4 and the PTO motor 7 allows the output of the PTO motor 7 to be used either for the utility vehicle to travel or for an external device.

(2) The embodiment described above uses the motive power transmission switching device 8 to select whether to use the output of the PTO motor 7 for the utility vehicle to travel. The embodiment may alternatively be configured in a similar manner to conversely cause the main motor 4 to assist the PTO motor 7 for increased motive power to be transmitted to the PTO device 70.

(3) The embodiment described above is a four-wheel drive utility vehicle configured to transmit motive power to both the front and rear wheels 11 and 12. The embodiment may alternatively be a four-wheel drive utility vehicle configured to transmit motive power to only either the front wheels 11 or the rear wheel 12. The present invention is applicable also to a three-wheeled vehicle or a two-wheeled vehicle other than a four-wheeled vehicle.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The present invention is applicable to an electric motor power train including a travel main motor and a PTO motor and to a utility vehicle including such an electric motor power train.

REFERENCE SIGNS LIST

1 Driving wheel
4 Main motor
5 Transmission
7 PTO motor
8 Motive power transmission switching device
9 Operation section
11 Front wheel
12 Rear wheel
31*a* Manual operation tool
51 Gear shift device
51*a* First gear shift section
51*b* Second gear shift section
51*c* Third gear shift section
52 Rear-wheel output section
53 Front-wheel output section
54 Front-wheel clutch
55 Propeller shaft
61 Differential device
62 Drive shaft
70 PTO device
71 PTO shaft
80 Branching power transmission mechanism
81 First power transmission shaft
82 Second power transmission shaft

The invention claimed is:

1. An electric motor power train for transmitting motive power to driving wheels of a vehicle, the electric motor power train comprising:

a main motor;

a power take-off (PTO) motor;

a PTO shaft configured to transmit an output of the PTO motor to a PTO device;

a transmission configured to receive an output of the main motor and the output of the PTO motor;

drive shafts coupled to the respective driving wheels;

a differential device configured to transmit an output of the transmission to the drive shafts; and a motive power transmission switching device configured to switch a state of transmission of the output of the PTO motor to the transmission, and wherein the motive power transmission switching device is a one-way clutch coupled at a first end to a first power transmission shaft configured to transmit motive power from the main motor and at a second end to a second power transmission shaft configured to transmit motive power from the PTO motor.

2. A utility vehicle, comprising:

the electric motor power train according to claim 1.

3. The electric motor power train according to claim 1, wherein:

the PTO shaft is provided with a branching power transmission mechanism including the first power transmission shaft and the second power transmission shaft, the first power transmission shaft is coupled to an output shaft of the main motor, the second power transmission shaft is parallel to the PTO shaft and functions as a branch shaft, and the motive power transmission switching device is interposed between the first power transmission shaft and the second power transmission shaft.

* * * * *